Oct. 24, 1950 M. M. COKER 2,526,935
HYDRAULICALLY ACTUATED CLUTCH AND BRAKE MECHANISM
Filed Dec. 22, 1947 3 Sheets-Sheet 1

INVENTOR.
Morton M. Coker
BY Charles M. Fryer
ATTORNEY

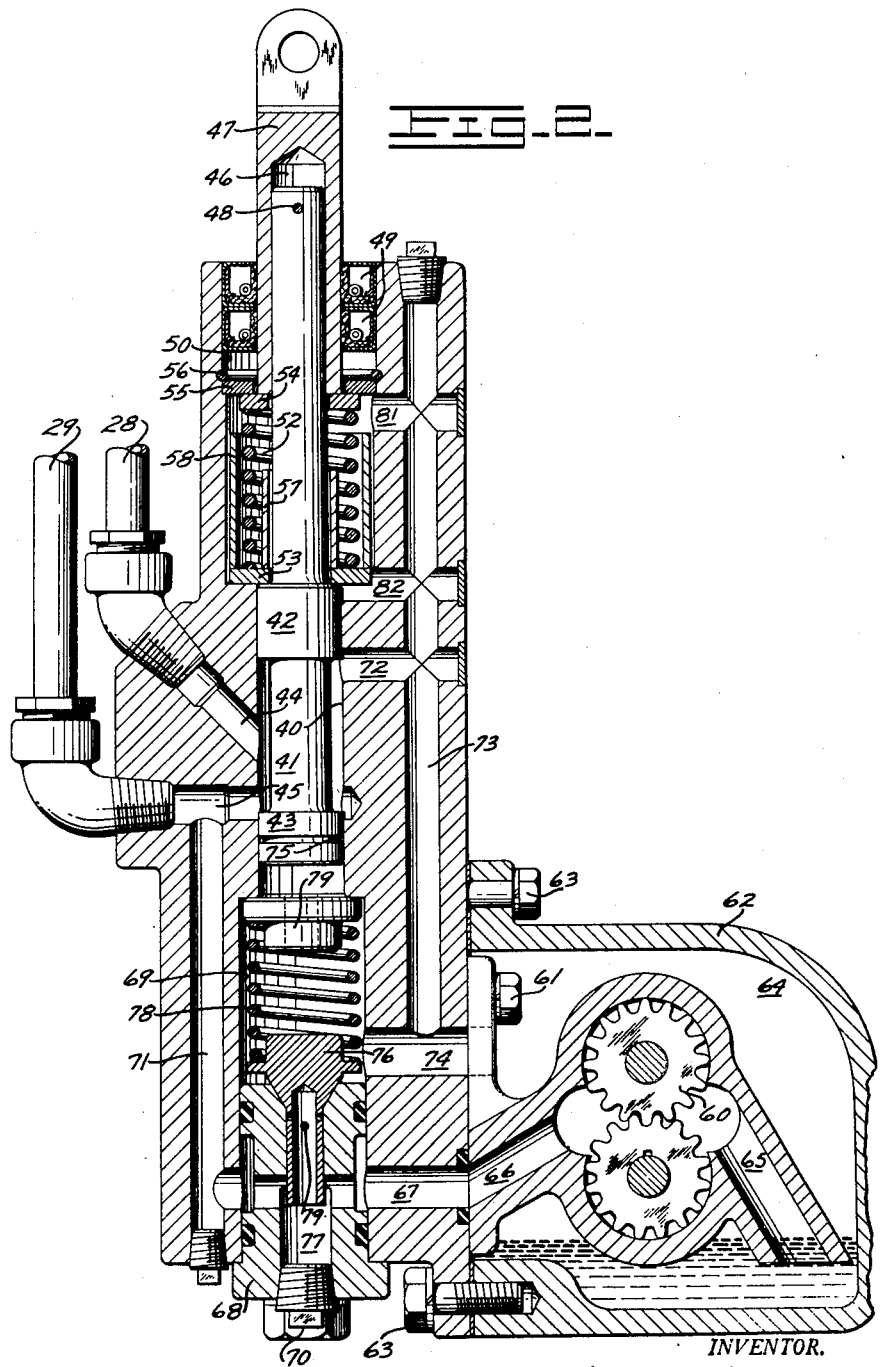

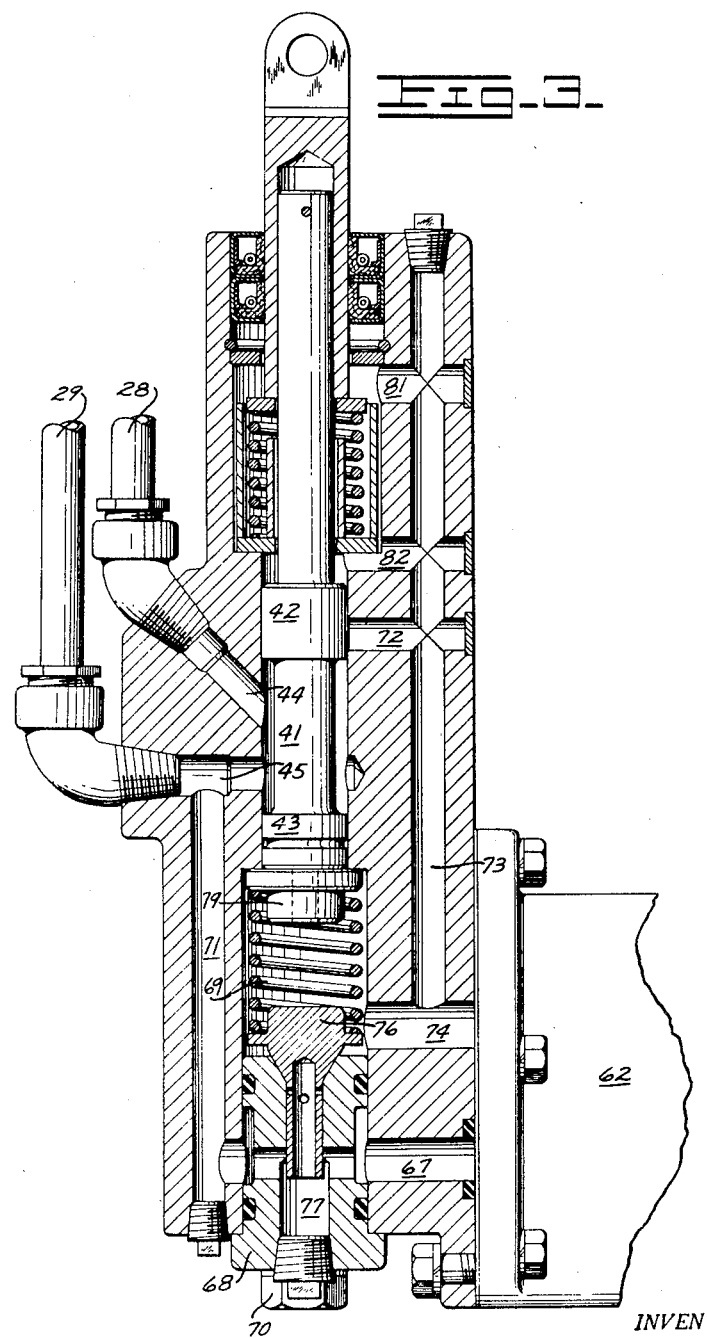

Patented Oct. 24, 1950

2,526,935

UNITED STATES PATENT OFFICE 2,526,935

HYDRAULICALLY ACTUATED CLUTCH AND BRAKE MECHANISM

Morton M. Coker, Peoria, Ill., assignor to Caterpillar Tractor Co., Peoria, Ill., a corporation of California Application December 22, 1947, Serial No. 793,258

2 Claims. (Cl. 192—12)

This invention relates to a hydraulic control means for a cable winding drum or winch and more particularly to means for hydraulically actuating the control levers of such a mechanism.

The invention is particularly adapted for use on a cable winding drum or winch associated with a tractor or like vehicle and powered by a suitable power take-off therefrom. It is conventional practice to provide such mechanisms with a clutch for transmitting power to the cable winding drum and a brake for preventing rotation of the drum when the clutch is disengaged. Usually such devices are provided with manually actuated levers for effecting engagement and disengagement of the clutch and brake. However, in many installations where it is desirable to have the operator stationed some distance away, the controls become quite complicated and require considerable effort on the part of the operator to actuate them.

In order to overcome the above mentioned and other difficulties it is an object of this invention to associate a hydraulically actuated piston with each of the control levers, such pistons being actuated by hydraulic pressure, and controlled by a single control valve. It is a further object of this invention to provide a control valve having a spring loaded relief, the spring load of which can be varied permitting an increase in the force acting on the hydraulic pistons. Further and more specific objects and advantages of this invention are made apparent in the following specification wherein a preferred form of the invention is described in detail by reference to the accompanying drawings.

For purposes of illustration, the invention is disclosed herein as associated with a cable control mechanism of the kind employed on a tractor wherein a power take-off shaft of the tractor is connected with a cable spooling mechanism, such as is disclosed in assignee's co-pending application of John W. Bridwell Serial No. 701,824, filed October 7, 1946, entitled "Mechanical Brake and Clutch Control." Its adaptability to other uses will however be readily apparent as the description proceeds.

In the drawings:

Fig. 2 is a longitudinal, sectional view of the control valve and fluid pump illustrating the control valve in a neutral position; and Fig. 3 is a longitudinal, sectional view of the control valve illustrating a position to effect disengagement of the brake and engagement of the clutch.

Figure 1:
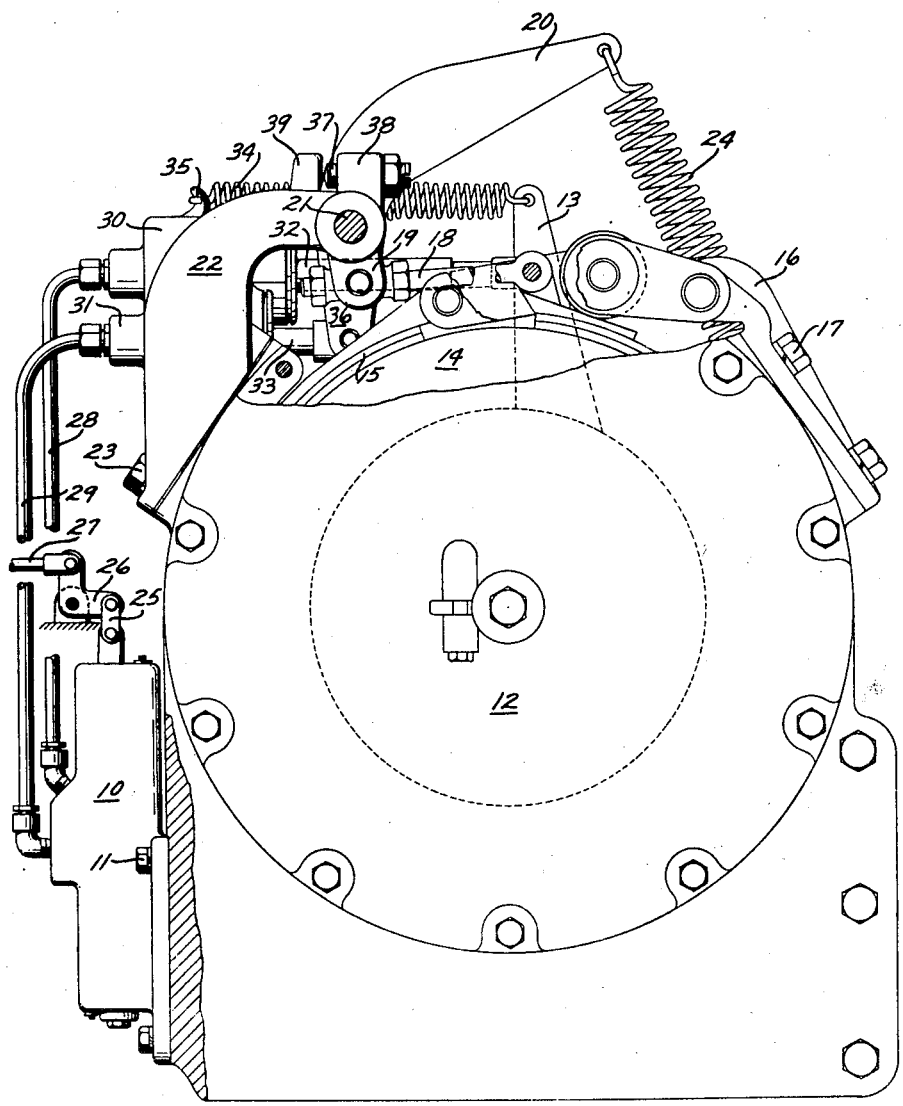
Fig. 1 is a side elevation of a cable winding drum embodying the present invention with portions broken away to illustrate more clearly the control linkage thereof.

In Fig. 1 of the drawings, a control valve 10 is shown as being rigidly secured by means of cap screws 11 to a housing 12 of a cable control unit such as is normally associated with a tractor or like vehicle and which serves to control a bulldozer or similar mechanism associated with the tractor. The cable control unit does not form a part of the present invention but the principal portions will be generally described in order to facilitate an understanding of the manner in which the invention functions.

The cable control unit comprises a cable winding drum (not shown) which is powered for rotation by a suitable power take-off from the tractor and which is provided with a clutch for transmitting such power. Engagement and disengagement of the clutch is effected by a control lever 13. A brake drum 14 is formed integrally with the cable winding drum and is encircled by a brake band 15, one end of which is anchored to a bracket 16, rigidly secured to the housing 12 by means of capscrews 17. The opposite end of the brake band is connected by means of an adjustable link 18 to an arm 19, formed integrally with a brake control lever 20. The control lever 20 is pivotally mounted about a pin 21 which is supported within a bracket 22 rigidly secured to the housing 12 by means of capscrews 23. The extending end of the brake lever 20 is connected to a spring 24, the opposite end of which is anchored to the housing 12. The action of the spring 24 causes the lever 20 to pivot about the pin 21 which in turn urges the brake band into frictional engagement with the brake drum 14. The arrangement is such that when it is desired to take in on the cable associated with the cable winding drum the clutch must be engaged and the brake must be disengaged by overcoming the force of the spring 24 which normally urges the brake into engagement.

The control valve is provided with manual control linkage comprising a link 25, a bellcrank lever 26, and a control rod, a portion of which is indicated at 27, and which may extend to the tractor operator's station (not shown). The control valve serves to direct fluid through a pair of hydraulic lines 28 and 29 to a pair of hydraulic jacks 30 and 31, such jacks being rigidly secured to the bracket 22. Slidably disposed within each of the jacks 30 and 31 is a piston (not shown), such pistons being provided with piston rods 32 and 33. The piston rod 32 is pivotally connected to the clutch control lever 13 so that when fluid is directed to the jack 30 the rod 32 is extended effecting engagement of the clutch. A spring 34 is connected to the extending end of the clutch control lever 13 and the opposite end of the spring is anchored to a lug 35 formed integrally with the jack 30. The spring 34 opposes the action of the jack and serves to return the clutch control lever 13 to a disengaged position when hydraulic pressure is not applied to the jack.

The piston rod 33 associated with the jack 31 is pivotally connected to an arm 36 formed integrally with the brake lever 20. When fluid is supplied to the jack 31 the rod 33 is extended causing the lever 20 to pivot about the pin 21 overcoming the force of the spring 24 and thus effecting disengagement of the brake. Rotation of the lever 20 is limited by engagement of an adjustable stop screw 37 which is disposed within an arm 38 formed integrally with the brake lever 20 and which engages a lug 39 formed integrally with the bracket 22.

As is illustrated in Fig. 2, the control valve 10 is provided with an elongated bore 40 for the sliding reception of a valve spool 41. The valve spool is provided with raised lands 42 and 43 which when the valve spool is manipulated serve selectively to direct fluid from the axial bore 40 through a drilled passage 44 to the hydraulic line 28 or through a second drilled passage 45 to the hydraulic line 29. The extending end of the valve spool 41 is received in a recess 46 provided in a sleeve 47 and rigidly connected thereto by means of a pin 48. The sleeve 47 extends from the control valve and is connected to the manual control link 25 illustrated in Fig. 1. A pair of oil seals 49 are disposed within a counterbore 50 provided in the body of the control valve, such seals serving to effect an oil and dirt tight seal between the control valve body and the sleeve 47.

The valve spool 41 is normally held in a central or neutral position such as is illustrated in Fig. 2 by means of a spring 52 which is received in the counterbore 50 and which is interposed between a pair of washers 53 and 54. The washer 53 normally bears against the end of the land 42 on the spool valve and against a shoulder formed by the end of the counterbore 50. The washer 54 normally bears against the sleeve 47 and against a spring retainer 55 which is held in place by a snap ring 56 disposed within a suitable recess in the counterbore 50. Disposed about the valve spool and encircled by the spring 52 is a spacing sleeve 57 which serves to limit the movement of the valve spool in a downward direction. A second spacing sleeve 58 is disposed about the spring 52 and serves to limit the movement of the valve spool in an upward direction.

A constant delivery oil pump 60 which is driven by a suitable power take-off from the tractor (not shown) is rigidly secured to the body of the control valve 10 by means of cap screws 61. The pump is enclosed within a housing 62 secured to the control valve by means of cap screws 63 to form a chamber 64 which serves as a fluid reservoir for the hydraulic system. The pump 60 is provided with inlet and outlet passages 65 and 66, the outlet passage 66 communicating with a passage 67 in the body of the control valve 10. Passage 67 extends transversely through a sleeve member 68 and communicates with a passage 71 which in turn communicates with the passage 45.

The sleeve 68 is disposed within a counterbore 69 provided in the body of the control valve and is rigidly connected thereto by means of capscrews 70. The function of the sleeve 68 will be made apparent as the description proceeds. Thus fluid under pressure from the pump is admitted to the axial bore 40 by way of passages 67, 71, and 45. Such fluid is returned from the bore 40 to the chamber 64 by way of passages 72, 73, and 74, the passage 74 being in communication with the counterbore 69 as well as with the passage 73 and chamber 64.

When the valve spool is in the position illustrated in Fig. 2, fluid from the pump is admitted to the axial bore 40 by way of drilled passages 67, 71, and 45. However, as the passage 72 is open to the axial bore 40, such fluid is returned to the chamber 64 by way of drilled passages 72, 73, and 74. Under this free circulating condition the pressure within the system will not be sufficient to actuate the hydraulic jacks 30 and 31 illustrated in Fig. 1.

When it is desired to release the brake associated with the cable winding drum so that the cable is permitted to spool out in response to cable tension the spool valve is moved upwardly as viewed in Fig. 2 until the land 43 closes off the passage 45 preventing communication between the passage 45 and the axial bore 40. Under this condition all of the pressure from the pump will be directed through the hydraulic line 29 actuating the jack 31. The land 43 is provided with an annular relief 75 which distributes this pressure equally around the periphery of the land thus preventing binding of the valve spool in the axial bore 40. When the pressure is directed through the conduit 29 the jack 31 is actuated causing the brake lever 20, illustrated in Fig. 1, to be rotated until the stop screw 37 contacts the lug 39 preventing further movement of lever 20. At this time the brake will be fully disengaged and at the same time the pressure within the hydraulic line 29 will rise. In order to prevent excessive pressure in the line 29 a spring loaded relief valve 76 is provided in the counterbore 69. The relief valve is provided with an extending tubular stem-like portion which is disposed within and normally closes a passage 77 provided in the sleeve 68. Valve 76 is urged toward its closed position by a spring 78 interposed between the relief valve and a spring retainer 79 seated against a shoulder formed by the end of the counterbore 69. When the pressure within the passage 77 exceeds a predetermined value the spring 78 will be compressed permitting fluid from the passage 77 to flow through a plurality of apertures 79 provided in the hollow stem of the relief valve thus establishing communication between the passage 67 and the counterbore 69. Such fluid is returned from the counterbore 69 to the chamber 64 by way of the passage 74.

When it is desired to take in on the cable associated with the cable winding drum the valve spool is moved to the position illustrated in Fig. 3 in which position the land 42 closes off the passage 72 thus preventing fluid from being returned to the chamber 64 from the axial bore 40. Under this condition fluid under pressure will be directed through both conduit lines 28 and 29 actuating the jacks 30 and 31 shown in Fig. 1. Due to a differential in the force exerted by the spring 34 associated with the clutch lever 13 and the spring 24 associated with the brake lever 20 the clutch will be engaged first picking up the load and then the brake 24 will be released permitting the cable winding drum to be rotated taking in the cable.

Under some conditions it is desirable that an increased force be exerted on the clutch lever 13 to prevent slipping of the clutch due to high torque conditions during periods of overload. One of the advantages of this control is that by further movement of the valve spool 41 downwardly as viewed in Fig. 3, the end of the valve spool adjacent to the land 43 will contact the spring retainer 79 displacing it downwardly thus increasing the spring load acting on the pressure relief valve 76. By increasing the spring load acting on the pressure relief valve the pressure exerted on the jacks is proportionately increased resulting in the application of an increased force on the clutch urging it into tighter engagement.

A pair of passages 81 and 82 are provided in the control valve housing and serve to establish communication between the counterbore 50 and the drilled passage 73 thus equalizing the pressure in the counterbore 50 during movement of the valve spool 41 and preventing the formation of any hydraulic lock.

I claim:

1. In a hydraulic control for a cable winding drum having a brake and a clutch, a hydraulic cylinder for engaging the clutch, a hydraulic cylinder for releasing the brake, a single control valve for directing fluid under pressure to both said cylinders, a spring loaded bypass valve to prevent excessive pressure in the cylinders, and means controlled by operation of the control valve to increase the load of the valve spring when greater pressure is required in the cylinders.

2. In a hydraulic control for a cable winding drum having a brake and a clutch, a hydraulic cylinder for engaging the clutch, a hydraulic cylinder for releasing the brake, a sliding spool type control valve for directing fluid under pressure to said cylinders, and a bypass for excessive pressure including a spring loaded valve with its spring disposed for engagement by the spool of the control valve to increase its load when greater pressure is required in the cylinders.

MORTON M. COKER.

REFERENCES CITED

The following references are of record in the file of this patent:

UNITED STATES PATENTS

| Number | Name | Date |
| --- | --- | --- |
| 1,864,126 | Ferris | June 21, 1932 |
| 2,220,517 | Friedman | Nov. 5, 1940 |
| 2,270,431 | Freeman | Jan. 20, 1942 |
| 2,279,597 | Selmer | Apr. 14, 1942 |
| 2,308,299 | Page | Jan. 12, 1943 |
| 2,366,433 | Bridwell et al. | Jan. 2, 1945 |
| 2,392,421 | Stephens | Jan. 8, 1946 |
| 2,442,510 | Peterson et al. | June 1, 1948 |